United States Patent
Casper et al.

(10) Patent No.: US 9,720,844 B2
(45) Date of Patent: *Aug. 1, 2017

(54) PROVIDING INDIRECT DATA ADDRESSING IN AN INPUT/OUTPUT PROCESSING SYSTEM WHERE THE INDIRECT DATA ADDRESS LIST IS NON-CONTIGUOUS

(71) Applicant: International Business Machines Corporation, Armonk, NY (US)

(72) Inventors: Daniel F. Casper, Poughkeepsie, NY (US); Mark P. Bendyk, Hyde park, NY (US); John R. Flanagan, Poughkeepsie, NY (US); Catherine C. Huang, Poughkeepsie, NY (US); Matthew J. Kalos, Tucson, AZ (US); Ugochukwu C. Njoku, Yonkers, NY (US); Dale F. Riedy, Poughkeepsie, NY (US); Gustav E. Sittmann, III, Webster Groves, MO (US); Harry M. Yudenfriend, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/228,436

(22) Filed: Aug. 4, 2016

(65) Prior Publication Data

US 2016/0342525 A1 Nov. 24, 2016

Related U.S. Application Data

(63) Continuation of application No. 14/483,700, filed on Sep. 11, 2014, now Pat. No. 9,436,272, which is a (Continued)

(51) Int. Cl.
*G06F 3/00* (2006.01)
*G06F 12/1036* (2016.01)
(Continued)

(52) U.S. Cl.
CPC .......... *G06F 12/1036* (2013.01); *G06F 3/00* (2013.01); *G06F 3/0604* (2013.01);
(Continued)

(58) Field of Classification Search
CPC .... G06F 13/124; G06F 3/0673; G06F 3/0604; G06F 3/0655; G06F 3/00
See application file for complete search history.

(56) References Cited

U.S. PATENT DOCUMENTS 6,922,548 B1   7/2005   Moore et al.
7,660,421 B2   2/2010   Hopkins et al.
(Continued)

OTHER PUBLICATIONS

Simmons et al.; "A Performance Comparison of Three Supercomputers: Fujitsu VP-2600, NEC SX-3 and CRAY Y-MP"; ACM, Conference on Hight Performance Networking and Computing, Jul. 1991 ACM/IEEE conference on Supercomputing, Albuquerque, NM; pp. 150-157.

*Primary Examiner* — Ernest Unelus
(74) *Attorney, Agent, or Firm* — Cantor Colburn LLP; Steven Chiu

(57) ABSTRACT

A computer program product for processing input/output (I/O) data is provided for performing a method that includes receiving a transport control word (TCW) including an indirect data address including a starting location of a transport mode indirect data address list (TIDAL) of storage addresses, the TIDAL including a plurality of entries configured as transport mode indirect data address words (TIDAWs). The method includes accessing an entry of the TIDAL, which includes: 1) based on the entry of the TIDAL indicating that the address is a data address, gathering data from a data storage location corresponding to the data address, and accessing a next entry of the TIDAL, and 2) based on the entry of the TIDAL indicating that the address is an address of a next entry of the TIDAL, obtaining the next entry of the TIDAL from another storage location that is located non-contiguously to the entry storage location.

24 Claims, 11 Drawing Sheets

Related U.S. Application Data continuation of application No. 13/784,132, filed on Mar. 4, 2013, now Pat. No. 9,043,494, which is a continuation of application No. 13/024,468, filed on Feb. 10, 2011, now Pat. No. 8,392,619, which is a continuation of application No. 12/031,038, filed on Feb. 14, 2008, now Pat. No. 7,890,668.

(51) Int. Cl.
*G06F 13/12* (2006.01)
*G06F 3/06* (2006.01)
*G06F 12/1009* (2016.01)

(52) U.S. Cl.
CPC .......... *G06F 3/0655* (2013.01); *G06F 3/0673* (2013.01); *G06F 12/1009* (2013.01); *G06F 13/124* (2013.01); *G06F 2212/65* (2013.01)

(56) References Cited

U.S. PATENT DOCUMENTS

| | | |
|---|---|---|
| 7,668,984 B2 | 2/2010 | Gregg et al. |
| 7,890,668 B2 | 2/2011 | Casper et al. |
| 8,169,938 B2 | 5/2012 | Duchscher et al. |
| 8,254,571 B1 | 8/2012 | Boyen |
| 8,392,619 B2 | 3/2013 | Casper et al. |
| 9,043,494 B2 | 5/2015 | Casper et al. |
| 2010/0158247 A1 | 6/2010 | Hopkins et al. |
| 2012/0110222 A1 | 5/2012 | Dang et al. |
| 2012/0311390 A1 | 12/2012 | Bubb et al. |

PROVIDING INDIRECT DATA ADDRESSING IN AN INPUT/OUTPUT PROCESSING SYSTEM WHERE THE INDIRECT DATA ADDRESS LIST IS NON-CONTIGUOUS

CROSS REFERENCE TO RELATED APPLICATIONS

This application is a continuation of U.S. Ser. No. 14/483,700, filed Sep. 11, 2014, which is a continuation of U.S. patent application Ser. No. 13/784,132 filed Mar. 4, 2013, which is a continuation of U.S. patent application Ser. No. 13/024,468 filed Feb. 2, 2011, now U.S. Pat. No. 8,392,619, which is a continuation of U.S. patent application Ser. No. 12/031,038 filed Feb. 14, 2008, now U.S. Pat. No. 7,890,668 the entire disclosures of which is incorporated herein by reference.

BACKGROUND

Field of the Invention

The present disclosure relates generally to input/output processing, and in particular, to providing a non-contiguous indirect data addressing list at an I/O subsystem of an I/O processing system.

Description of Background

Input/output (I/O) operations are used to transfer data between memory and I/O devices of an I/O processing system. Specifically, data is written from memory to one or more I/O devices, and data is read from one or more I/O devices to memory by executing I/O operations.

To facilitate processing of I/O operations, an I/O subsystem of the I/O processing system is employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices.

The channel subsystem may employ channel command words (CCWs) to transfer data between the I/O devices and memory. A CCW specifies the command to be executed. For commands initiating certain I/O operations, the CCW designates the memory area associated with the operation, the action to be taken whenever a transfer to or from the area is completed, and other options.

During I/O processing, a list of CCWs is fetched from memory by a channel. The channel parses each command from the list of CCWs and forwards a number of the commands, each command in its own entity, to a control unit coupled to the channel. The control unit then processes the commands. The channel tracks the state of each command and controls when the next set of commands are to be sent to the control unit for processing. The channel ensures that each command is sent to the control unit in its own entity. Further, the channel infers certain information associated with processing the response from the control unit for each command.

Performing I/O processing on a per CCW basis may involve a large amount of processing overhead for the channel subsystem, as the channels parse CCWs, track state information, and react to responses from the control units. Therefore, it may be beneficial to shift much of the processing burden associated with interpreting and managing CCW and state information from the channel subsystem to the control units. Simplifying the role of channels in communicating between the control units and an operating system in the I/O processing system may increase communication throughput as less handshaking is performed. However, altering command sequences, as well as roles of the channel subsystem and the control units, allows the amount of data that is transferred within a single I/O operation to more than one megabyte. This is the maximum amount of data that can be transferred with one continuous list of transport indirect data addresses when the system page size is 4 k bytes. Currently, an existing Channel Command Word (CCW) cannot support a data transfer of more than 64 k bytes within a single I/O operation because of the limitation of the two byte count field in the CCW. The Transport Control Word (TCW) solved that problem by increasing the byte count to four bytes in the TCW, but then the next limitation of one megabyte was encountered because the transport indirect data address list (TIDAL) must be contained in one page which is 4 k bytes which only allowed 256 address list entries.

SUMMARY

Embodiments include a computer program product for processing input/output (I/O) data at an I/O subsystem of an I/O processing system. The computer program product includes a computer readable storage medium having program instructions embodied therewith, wherein the computer readable storage medium is not a transitory signal per se. The program instructions are executable by a processing circuit to perform a method that includes receiving a transport control word (TCW) at the I/O subsystem for an I/O operation, the TCW including an indirect data address for data associated with the I/O operation, the indirect data address including a starting location of a transport mode indirect data address list (TIDAL) of storage addresses that collectively specify the data, the TIDAL including a plurality of entries configured as transport mode indirect data address words (TIDAWs). The method also includes gathering the data, wherein gathering comprises accessing an entry of the TIDAL, the entry located at an entry storage location and including an address. Accessing the entry includes: 1) based on the entry of the TIDAL indicating that the address is a data address, gathering data from a data storage location corresponding to the data address, and accessing a next entry of the TIDAL, and 2) based on the entry of the TIDAL indicating that the address is an address of a next entry of the TIDAL, obtaining the next entry of the TIDAL from another storage location that is located non-contiguously to the entry storage location. The method further includes transmitting gathered data to a control unit in the I/O processing system, the control unit configured to control an I/O device for executing the I/O operation.

Other embodiments include an apparatus for processing input/output (I/O) data, which includes an I/O subsystem configured for communication with a control unit in an I/O processing system. The I/O subsystem is configured to perform a method that includes receiving a transport control word (TCW) at the I/O subsystem for an I/O operation, the TCW including an indirect data address for data associated with the I/O operation, the indirect data address including a starting location of a transport mode indirect data address list (TIDAL) of storage addresses that collectively specify the data, the TIDAL including a plurality of entries configured as transport mode indirect data address words (TIDAWs). The method also includes gathering the data, wherein gathering comprises accessing an entry of the TIDAL, the entry located at an entry storage location and including an address, wherein accessing includes: 1) based on the entry of the TIDAL indicating that the address is a data address, gathering data from a data storage location corresponding to the data address, and accessing a next entry of the TIDAL, and 2) based on the entry of the TIDAL indicating that the address is an address of a next entry of the TIDAL, obtaining the next entry of the TIDAL from another storage location that is located non-contiguously to the entry storage location. The method further includes transmitting gathered data to the control unit, the control unit configured to control an I/O device for executing the I/O operation.

Further embodiments include a method of processing input/output (I/O) data at an I/O subsystem configured for communication with a control unit in an I/O processing system. The method includes receiving a transport control word (TCW) at an I/O subsystem for an I/O operation, the TCW including an indirect data address for data associated with the I/O operation, the indirect data address including a starting location of a transport mode indirect data address list (TIDAL) of storage addresses that collectively specify the data, the list including a plurality of entries configured as transport mode indirect data address words (TIDAWs). The method also includes gathering the data, wherein gathering comprises accessing an entry of the TIDAL, the entry located at an entry storage location and including an address, wherein accessing includes: 1) based on the entry of the TIDAL indicating that the address is a data address, gathering data from a data storage location corresponding to the data address, and accessing a next entry of the TIDAL, and 2) based on the entry of the TIDAL indicating that the address is an address of a next entry of the TIDAL, obtaining the next entry of the TIDAL from another storage location that is located non-contiguously to the entry storage location. The method further includes transmitting gathered data to the control unit, the control unit configured to control an I/O device for executing the I/O operation.

Other articles of manufacture, apparatuses, and/or methods according to embodiments will be or become apparent to one with skill in the art upon review of the following drawings and detailed description. It is intended that all such additional articles of manufacture, apparatuses, and/or methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
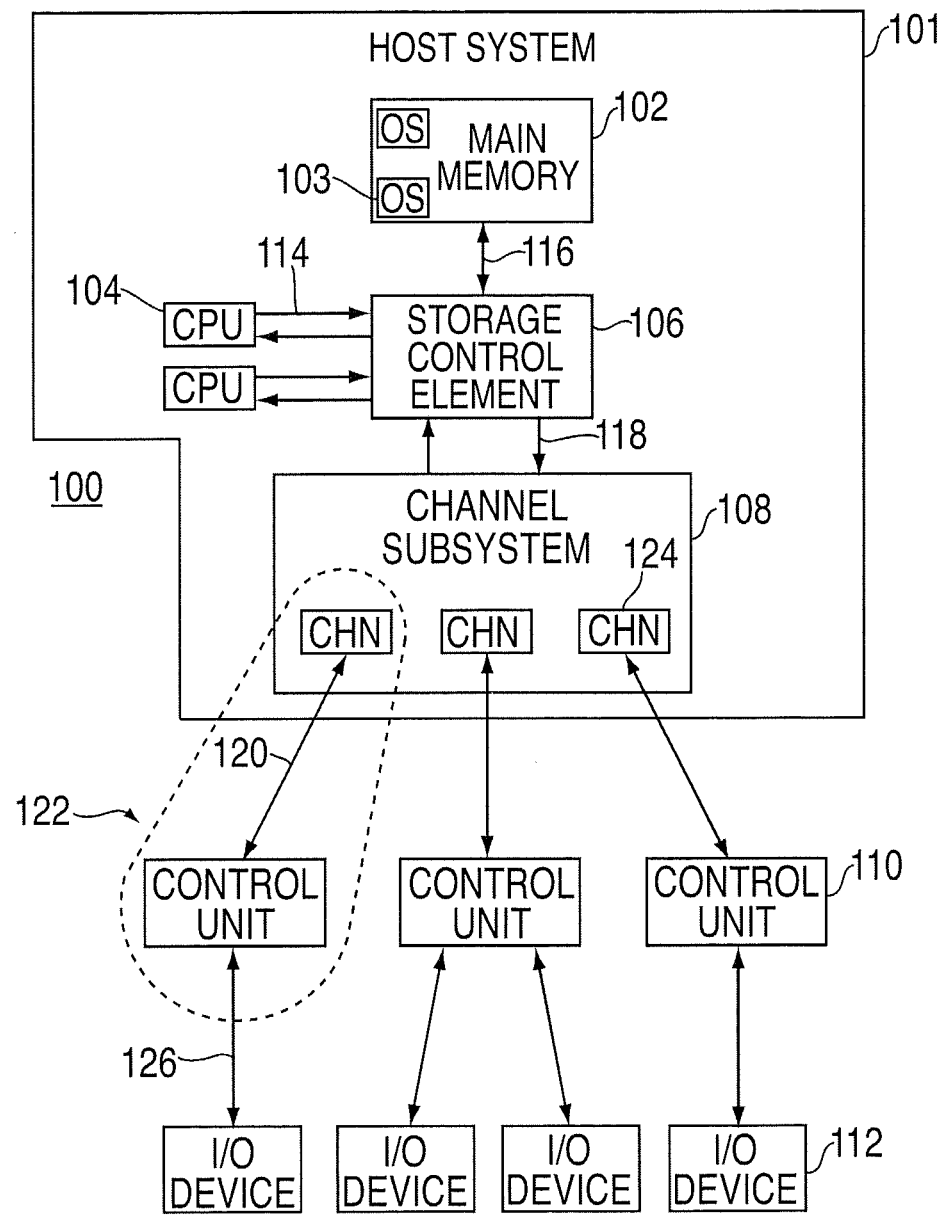
FIG. 1 depicts one embodiment of an I/O processing system incorporating and using one or more aspects of the present invention.

The detailed description explains the preferred embodiments of the invention, together with advantages and features, by way of example with reference to the drawings.

DETAILED DESCRIPTION

In accordance with an aspect of the present invention, input/output (I/O) processing is facilitated. I/O processing is facilitated, in one example, by reducing communications between components of an I/O processing system used to perform the I/O processing. For instance, the number of exchanges and sequences between an I/O communications adapter, such as a channel, and a control unit is reduced. This is accomplished by sending a plurality of commands from the I/O communications adapter to the control unit as a single entity for execution by the control unit, and by the control unit sending the data resulting from the commands, if any, as a single entity.

The plurality of commands are included in a block, referred to herein as a transport command control block (TCCB), an address of which is specified in a transport control word (TCW). The TCW is sent from an operating system (OS) or other application to the I/O communications adapter, which in turn forwards the TCCB in a command message to the control unit for processing. The control unit processes each of the commands absent a tracking of status relative to those individual commands by the I/O communications adapter. The plurality of commands is also referred to as a channel program, which is parsed and executed on the control unit rather than the I/O communications adapter.

In an exemplary embodiment, the TCW for an I/O operation includes pointers indicating the location of the control data (e.g., the TCCB) and the customer data associated with the I/O operation. In an exemplary embodiment, the pointers refer to an indirect data address, referred to herein as a transport mode indirect data address list (TIDAL). The TIDAL includes a list of addresses where the data is located; these addresses are referred to herein as transport mode indirect data address words (TIDAWs). In the current system design with 4K pages the TIDAL cannot be larger than four kilobytes (4K), thus limiting the number of continuous TIDAWs that may be included in a single TIDAL to 256 (each TIDAL is 16 bytes). This limits the total amount of data that can be transferred by one I/O operation to one megabyte assuming 4K pages, each TIDAL is 16 bytes and the TIDAL has to be contained in one 4K page. In an exemplary embodiment of the present invention, this limitation is removed by allowing a TIDAW address to indicate the starting location of the next TIDAWs at another storage location which may be in a different page. A flag in the TIDAW is utilized to indicate whether the address of the TIDAW includes a data address or an address of the continuation of the TIDAW list. In this manner, TIDAWs making up a single TIDAL can be located in non-contiguous storage locations and thus, more than 256 TIDAWs can be included in a single TIDAL list. This allows more data to be transferred within a single I/O operation. For example, in an exemplary embodiment, where the count field in the TCW is four bytes, about four gigabytes (four gigabytes minus one byte) may be transferred within a single I/O operation.

One example of an I/O processing system incorporating and using one or more aspects of the present invention is described with reference to FIG. 1. I/O processing system 100 includes a host system 101, which further includes for instance, a main memory 102, one or more central processing units (CPUs) 104, a storage control element 106, and a channel subsystem 108. The host system 101 may be a large scale computing system, such as a mainframe or server. The I/O processing system 100 also includes one or more control units 110 and one or more I/O devices 112, each of which is described below.

Main memory 102 stores data and programs, which can be input from I/O devices 112. For example, the main memory 102 may include one or more operating systems (OSs) 103 that are executed by one or more of the CPUs 104. For example, one CPU 104 can execute a Linux® operating system 103 and a z/OS® operating system 103 as different virtual machine instances. The main memory 102 is directly addressable and provides for high-speed processing of data by the CPUs 104 and the channel subsystem 108.

CPU 104 is the controlling center of the I/O processing system 100. It contains sequencing and processing facilities for instruction execution, interruption action, timing functions, initial program loading, and other machine-related functions. CPU 104 is coupled to the storage control element 106 via a connection 114, such as a bidirectional or unidirectional bus.

Storage control element 106 is coupled to the main memory 102 via a connection 116, such as a bus; to CPUs 104 via connection 114; and to channel subsystem 108 via a connection 118. Storage control element 106 controls, for example, queuing and execution of requests made by CPU 104 and channel subsystem 108.

In an exemplary embodiment, channel subsystem 108 provides a communication interface between host system 101 and control units 110. Channel subsystem 108 is coupled to storage control element 106, as described above, and to each of the control units 110 via a connection 120, such as a serial link. Connection 120 may be implemented as an optical link, employing single-mode or multi-mode waveguides in a Fibre Channel fabric. Channel subsystem 108 directs the flow of information between I/O devices 112 and main memory 102. It relieves the CPUs 104 of the task of communicating directly with the I/O devices 112 and permits data processing to proceed concurrently with I/O processing. The channel subsystem 108 uses one or more channel paths 122 as the communication links in managing the flow of information to or from I/O devices 112. As a part of the I/O processing, channel subsystem 108 also performs the path-management functions of testing for channel path availability, selecting an available channel path 122 and initiating execution of the operation with the I/O devices 112.

Each channel path 122 includes a channel 124 (channels 124 are located within the channel subsystem 108, in one example, as shown in FIG. 1), one or more control units 110 and one or more connections 120. In another example, it is also possible to have one or more dynamic switches (not depicted) as part of the channel path 122. A dynamic switch is coupled to a channel 124 and a control unit 110 and provides the capability of physically interconnecting any two links that are attached to the switch. In another example, it is also possible to have multiple systems, and therefore multiple channel subsystems (not depicted) attached to control unit 110.

Also located within channel subsystem 108 are subchannels (not shown). One subchannel is provided for and dedicated to each I/O device 112 accessible to a program through the channel subsystem 108. A subchannel (e.g., a data structure, such as a table) provides the logical appearance of a device to the program. Each subchannel provides information concerning the associated I/O device 112 and its attachment to channel subsystem 108. The subchannel also provides information concerning I/O operations and other functions involving the associated I/O device 112. The subchannel is the means by which channel subsystem 108 provides information about associated I/O devices 112 to CPUs 104, which obtain this information by executing I/O instructions.

Channel subsystem 108 is coupled to one or more control units 110. Each control unit 110 provides logic to operate and control one or more I/O devices 112 and adapts, through the use of common facilities, the characteristics of each I/O device 112 to the link interface provided by the channel 124. The common facilities provide for the execution of I/O operations, indications concerning the status of the I/O device 112 and control unit 110, control of the timing of data transfers over the channel path 122 and certain levels of I/O device 112 control.

Each control unit 110 is attached via a connection 126 (e.g., a bus) to one or more I/O devices 112. I/O devices 112 receive information or store information in main memory 102 and/or other memory. Examples of I/O devices 112 include card readers and punches, magnetic tape units, direct access storage devices, displays, keyboards, printers, pointing devices, teleprocessing devices, communication controllers and sensor based equipment, to name a few.

One or more of the above components of the I/O processing system 100 are further described in "IBM® z/Architecture Principles of Operation," Publication No. SA22-7832-05, 6th Edition, April 2007; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995; and U.S. Pat. No. 5,526,484 entitled "Method And System For Pipelining The Processing Of Channel Command Words," Casper et al., issued Jun. 11, 1996, each of which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

Figure 2A:
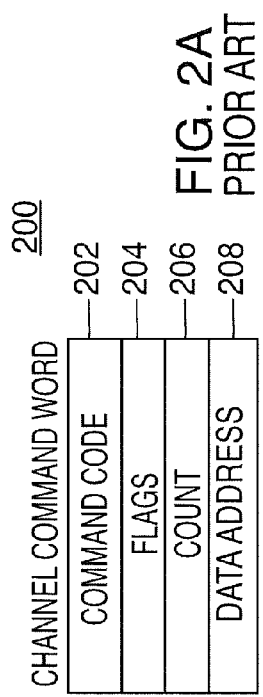
FIG. 2A depicts one example of a prior art channel command word.

In one embodiment, to transfer data between I/O devices 112 and memory 102, channel command words (CCWs) are used. A CCW specifies the command to be executed, and includes other fields to control processing. One example of a CCW is described with reference to FIG. 2A. A CCW 200 includes, for instance, a command code 202 specifying the command to be executed (e.g., read, read backward, control, sense and write); a plurality of flags 204 used to control the I/O operation; for commands that specify the transfer of data, a count field 206 that specifies the number of bytes in the storage area designated by the CCW to be transferred; and a data address 208 that points to a location in main memory that includes data, when direct addressing is employed, or to a list (e.g., contiguous list) of modified indirect data address words (MIDAWs) to be processed, when modified indirect data addressing is employed. Modified indirect addressing is further described in U.S. application Ser. No. 11/464,613, entitled "Flexibly Controlling The Transfer Of Data Between Input/Output Devices And Memory," Brice et al., filed Aug. 15, 2006, which is hereby incorporated herein by reference in its entirety.

One or more CCWs arranged for sequential execution form a channel program, also referred to herein as a CCW channel program. The CCW channel program is set up by, for instance, an operating system, or other software. The software sets up the CCWs and obtains the addresses of memory assigned to the channel program. An example of a CCW channel program is described with reference to FIG. 2B. A CCW channel program 210 includes, for instance, a define extent CCW 212 that has a pointer 214 to a location in memory of define extent data 216 to be used with the define extent command. In this example, a transfer in channel (TIC) 218 follows the define extent command that refers the channel program to another area in memory (e.g., an application area) that includes one or more other CCWs, such as a locate record 217 that has a pointer 219 to locate record data 220, and one or more write CCWs 221. Each write CCW 220 has a pointer 222 to a data area 224. The data area includes an address to directly access the data or a list of data address words (e.g., MIDAWs or IDAWs) to indirectly access the data. Further, CCW channel program 210 includes a predetermined area in the channel subsystem defined by the device address called the subchannel for status 226 resulting from execution of the CCW channel program.

The processing of a CCW channel program is described with reference to FIG. 3, as well as with reference to FIG. 2B. In particular, FIG. 3 shows an example of the various exchanges and sequences that occur between a channel and a control unit when a CCW channel program is executing. The link protocol used for the communications is FICON (Fibre Connectivity), in this example. Information regarding FICON is described in "Fibre Channel Single Byte Command Code Sets-3 Mapping Protocol (FC-SB-3), T11/Project 1357-D/Rev. 1.6, INCITS (March 2003), which is hereby incorporated herein by reference in its entirety.

Referring to FIG. 3, a channel 300 opens an exchange with a control unit 302 and sends a define extent command and data associated therewith 304 to control unit 302. The command is fetched from define extent CCW 212 (FIG. 2B) and the data is obtained from define extent data area 216. The channel 300 uses TIC 218 to locate the locate record CCW and the write CCW. It fetches the locate record command and data 306 (FIG. 3) from the locate record CCW 217 (FIG. 2B) and locate record data 220. The write command and data 308 (FIG. 3) is fetched from write CCW 221 and data area 224 (FIG. 2B). Each is sent to the control unit 302.

The control unit 302 opens an exchange 310 with the channel 300, in response to the open exchange of the channel 300. This can occur before or after locate command and data 306 and/or write command and data 308. Along with the open exchange, a response (CMR) is forwarded to the channel 300. The CMR provides an indication to the channel 300 that the control unit 302 is active and operating.

The control unit 302 provides the status to the channel 300 and closes the exchange 312. In response thereto, the channel 300 stores the data, examines the status and closes the exchange 314, which indicates to the control unit 302 that the status has been received.

The processing of the above CCW channel program to write 4 k of data requires two exchanges to be opened and closed and six sequences. The total number of exchanges and sequences between the channel and control unit is reduced through collapsing multiple commands of the channel program into a TCCB. The channel, e.g., channel 124 of FIG. 1, uses a TCW to identify the location of the TCCB, as well as locations for accessing and storing status and data associated with executing the channel program. The TCW is interpreted by the channel and is not sent or seen by the control unit.

One example of a channel program to write 4 k of data, as in FIG. 2B, but includes a TCCB, instead of separate individual CCWs, is described with reference to FIG. 4. As shown, a channel program 400, referred to herein as a TCW channel program, includes a TCW 402 specifying a location in memory of a TCCB 404, as well as a location in memory of a data area 406 or a TIDAL 410 (i.e., a list of transport mode indirect data address words (TIDAWs), similar to MIDAWs) that points to data area 406, and a status area 408. TIDAW zero 412, TIDAW one 414 and TIDAW two 416 (collectively TIDAWs 412-416) can reference different locations in the data area 406 for acquiring or storing data. The TIDAWs 412-416 can reference non-contiguous blocks of data or contiguous blocks of data. The TIDAWs 412-416 in TIDAL 410 may be located sequentially in memory or located non-contiguously relative to each other. While only three TIDAWs 412-416 are depicted in TIDAL 410, it will be understood that any number of TIDAWs can be included in the TIDAL 410.

The processing of a TCW channel program is described with reference to FIG. 5. The link protocol used for these communications is, for instance, Fibre Channel Protocol (FCP). In particular, three phases of the FCP link protocol are used, allowing host bus adapters to be used that support FCP to perform data transfers controlled by CCWs. FCP and its phases are described further in "Information Technology—Fibre Channel Protocol for SCSI, Third Version (FCP-3)," T10 Project 1560-D, Revision 4, Sep. 13, 2005, which is hereby incorporated herein by reference in its entirety.

Figure 5:
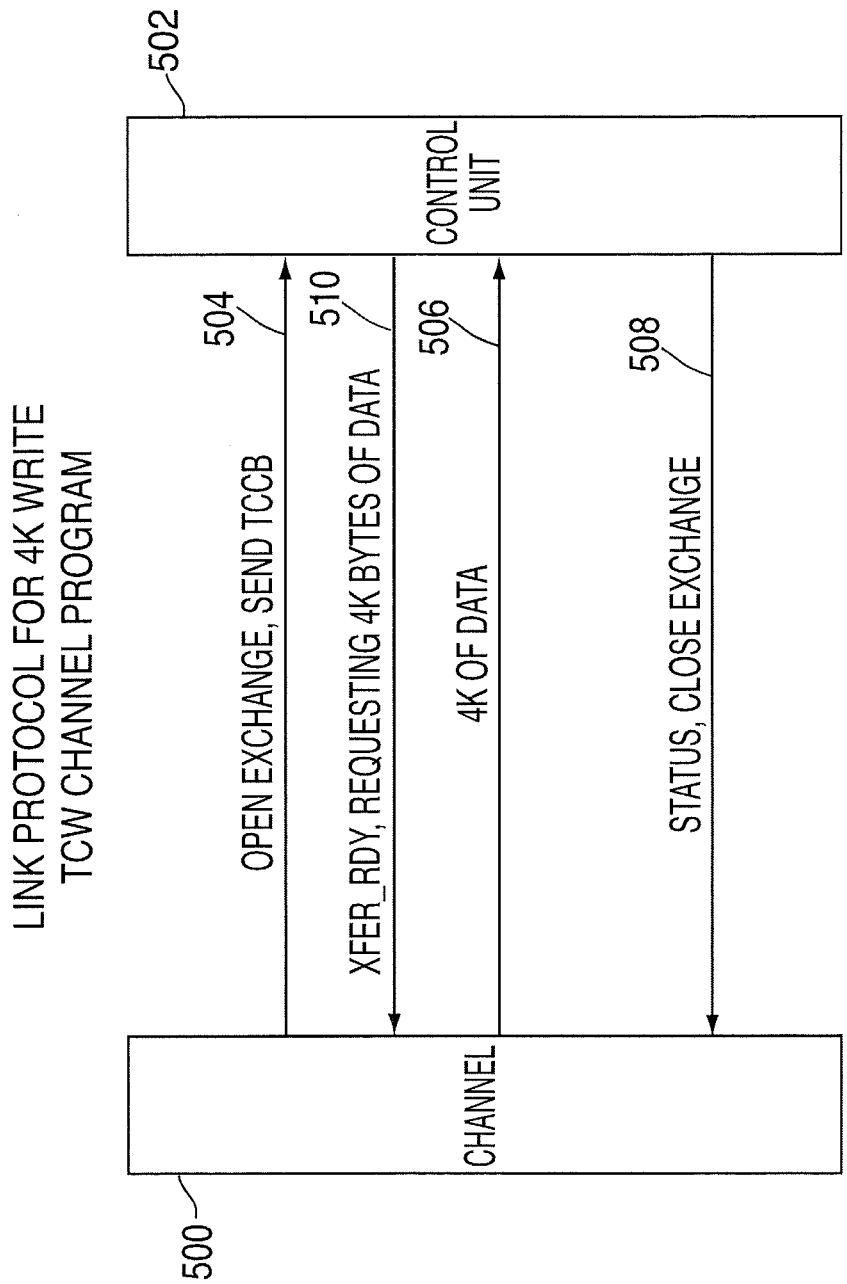
FIG. 5 depicts one embodiment of a link protocol used to communicate between a channel and control unit to execute the transport control word channel program of FIG. 4, in accordance with an aspect of the present invention.

Referring to FIG. 5, a channel 500 opens an exchange with a control unit 502 and sends TCCB 504 to the control unit 502. In one example, the TCCB 504 and sequence initiative are transferred to the control unit 502 in a FCP command, referred to as FCP_CMND information unit (IU) or a transport command IU. The control unit 502 transmits a transfer ready (XFER_RDY) IU 510 to the channel 500 when it is ready to receive data for the write commands received in the TCCB 504. In response to receiving the XFER_RDY IU 510, the channel 500 transfers the data 506 to the control unit 502, via, for instance, a FCP_Data IU. The control unit 502 executes the multiple commands of the TCCB 504 (e.g., define extent command, locate record command, write command as device control words (DCWs)) and writes the data 506 received from the channel 500. It also provides status and closes the exchange 508. As one example, final status is sent in a FCP status frame that has a bit active in, for instance, byte 10 or 11 of the payload of a FCP_RSP IU, also referred to as a transport response IU. The FCP_RSP IU payload may be used to transport FICON ending status along with additional status information.

The embodiment of the link protocol depicted in FIG. 5 is utilized when XFER_RDY is enabled. In the embodiment depicted in FIG. 5, the channel 500 cannot send the data 506 to the control unit 502 until it is requested by the control unit 502 via the XFER_RDY IU 510. In an alternate exemplary embodiment, XFER_RDY is disabled and the control unit does not transmit a XFER_RDY IU 510 to the channel 500. Thus, the channel 500 does not have to wait for the control unit 502 to request the data 506 before sending the data 506. This alternate embodiment, where XFER_RDY is disabled may be utilized when the channel 500 and the control unit 502 are located geographically far apart from each other (e.g., greater than twenty kilometers, greater than fifty kilometers) to improve performance. Unless otherwise specified, the discussion herein assumes that XFER_RDY is enabled.

In a further example, to write 4K of customer data, the channel 500 uses the FCP link protocol phases, as follows:

1. Transfer a TCCB in the FCP_CMND IU and sequence initiative to the control unit 502.
2. Wait for a XFER_RDY IU indicating that the control unit is ready to receive the data.
3. Transfer the IU of data, and sequence initiative to the control unit 502.
4. Final status is sent in a FCP status frame that has a bit active in, for instance, byte 10 or 11 of the FCP_RSP IU Payload. The FCP_RSP_INFO field or sense field is used to transport FICON ending status along with additional status information.

Figure 2B:
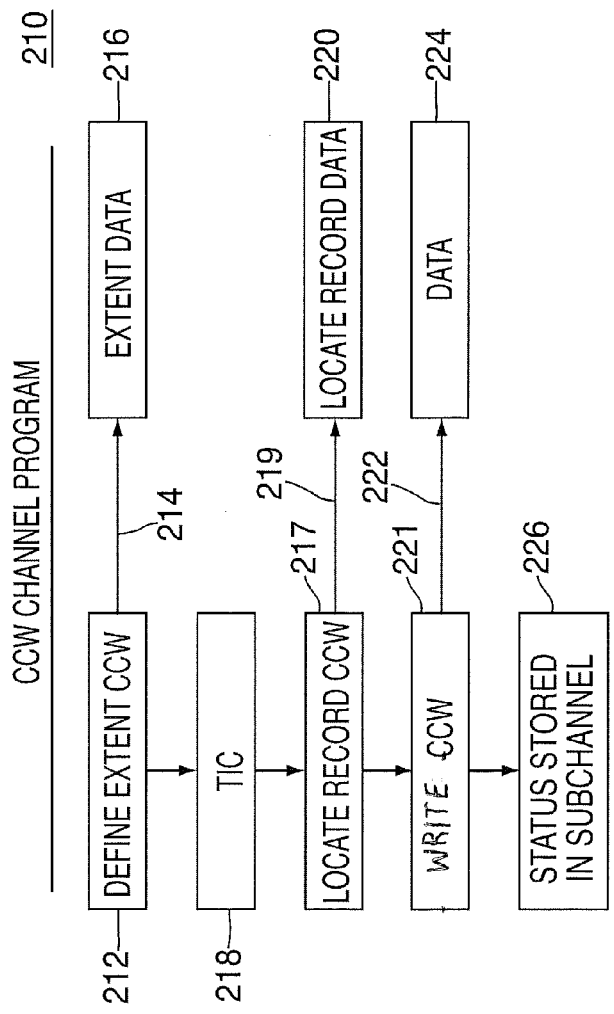
FIG. 2B depicts one example of a prior art channel command word channel program.
Figure 3:
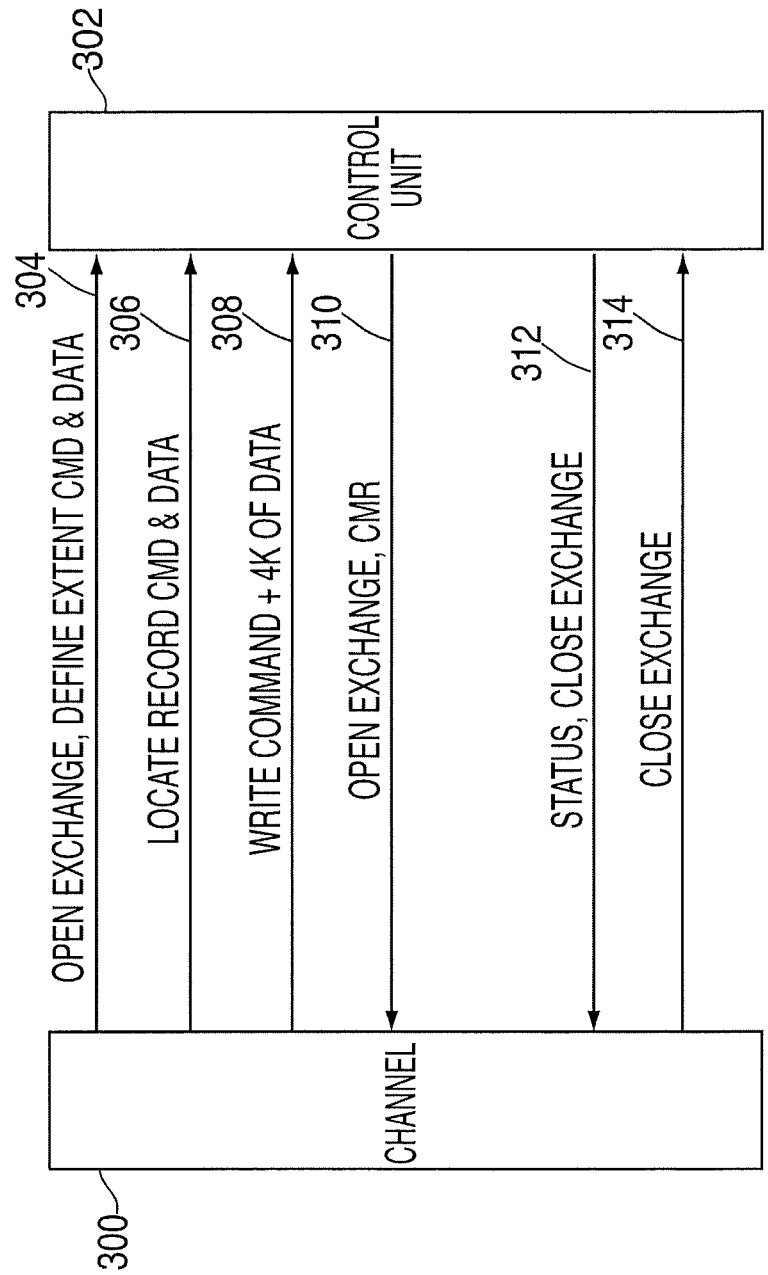
FIG. 3 depicts one embodiment of a prior art link protocol used in communicating between a channel and control unit to execute the channel command word channel program of FIG. 2B.
Figure 4:
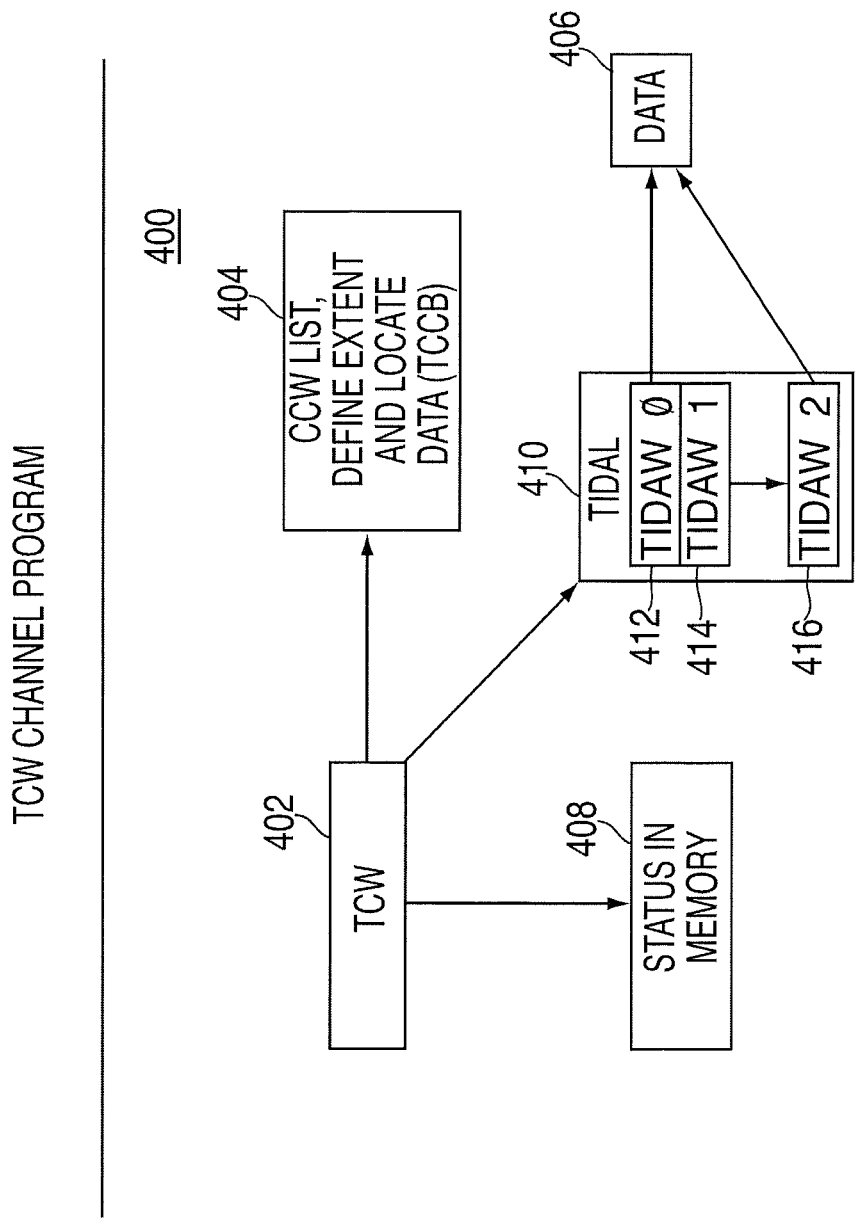
FIG. 4 depicts one embodiment of a transport control word channel program, in accordance with an aspect of the present invention.

By executing the TCW channel program of FIG. 4, there is only one exchange opened and closed (see also FIG. 5), instead of two exchanges for the CCW channel program of FIG. 2B (see also FIG. 3). Further, for the TCW channel program, there are four communication sequences (see FIGS. 4-5), as compared to six sequences for the CCW channel program (see FIGS. 2B-3).

Figure 6:
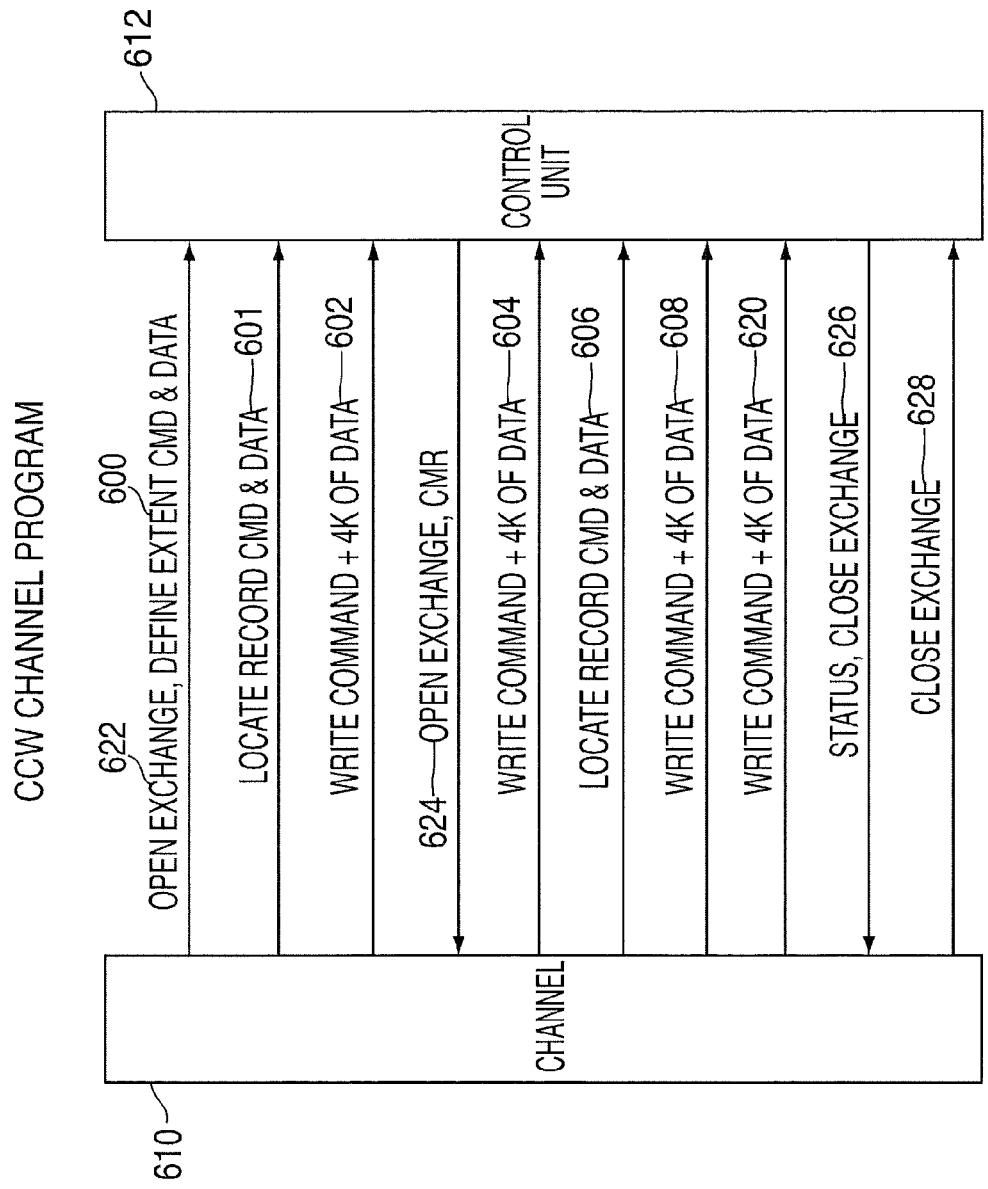
FIG. 6 depicts one embodiment of a prior art link protocol used to communicate between a channel and control unit in order to execute four write commands of a channel command word channel program.

The number of exchanges and sequences remain the same for a TCW channel program, even if additional commands are added to the program. Compare, for example, the communications of the CCW channel program of FIG. 6 with the communications of the TCW channel program of FIG. 7. In the CCW channel program of FIG. 6, each of the commands (e.g., define extent command and data 600, locate record command and data 601, write command and data 602, write command and data 604, locate record command and data 606, write command and data 608, and write command and data 620) are sent in separate sequences from channel 610 to control unit 612. This CCW channel program requires two exchanges to be opened and closed (e.g., open exchanges 622, 624 and close exchanges 626, 628), and ten communications sequences. This is compared to the four sequences and one exchange for the TCW channel program of FIG. 7, which accomplishes the same task as the CCW channel program of FIG. 6.

Figure 7:
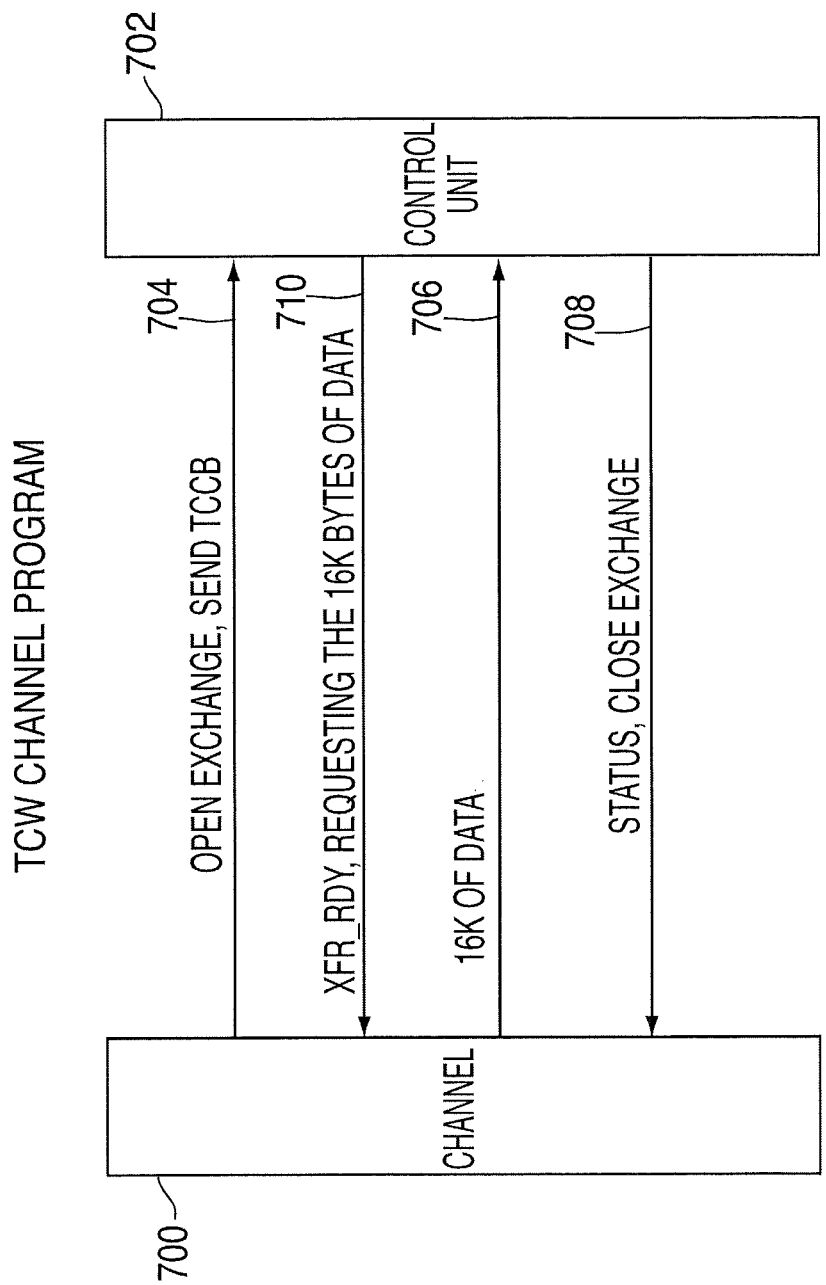
FIG. 7 depicts one embodiment of a link protocol used to communicate between a channel and control unit to process the four write commands of a transport control word channel program, in accordance with an aspect of the present invention.

As depicted in FIG. 7, a channel 700 opens an exchange with a control unit 702 and sends a TCCB 704 to the control unit 702. The TCCB 704 includes the define extent command, the two locate record commands, and the four write commands in DCWs, as described above. Similar to the example depicted in FIG. 5, the control unit 702 may use an XFER_RDY IU 710 to notify the channel 700 that it is ready receive data, provided that XFER_RDY support is not disabled. The channel 700 transmits 16 k of data 706 to the control unit 702 in a single sequence upon receipt of the XFER_RDY IU 710. The channel 700 inserts a CRC every 4K of the 16 k of data 706 in the sequence. The insertion of a CRC every 4K allows the control unit 702 to verify the 16K of data incrementally, rather than buffer the entire 16K for verification before completing the write commands in the TCCB 704. Additionally, the control unit 702 provides status to the channel 700 and closes the exchange 708. Thus, the TCW channel program of FIG. 7 requires much less communications to transfer the same amount of data as the CCW channel program of FIG. 6, while supporting incremental data verification via multiple CRC insertion in the output data stream from the channel 700.

Figure 8:
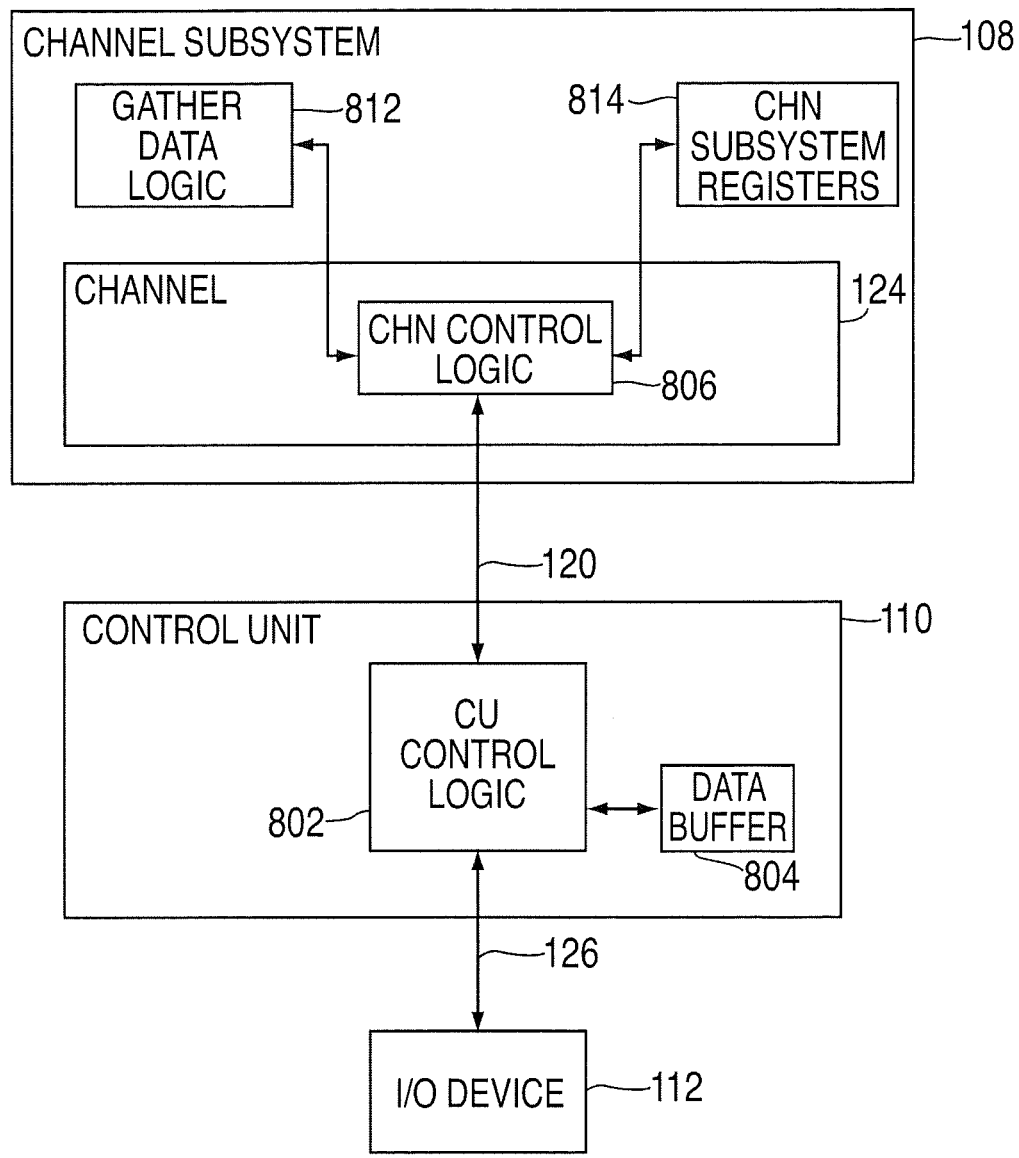
FIG. 8 depicts one embodiment of a control unit and a channel subsystem, in accordance with an aspect of the present invention.

Turning now to FIG. 8, one embodiment of channel 124 in the channel subsystem 108 and the control unit 110 of FIG. 1 that support TCW channel program execution are depicted in greater detail. The control unit 110 includes CU control logic 802 to parse and process messages containing a TCCB, such as the TCCB 704 of FIG. 7, as well as data received from the channel 124 via the connection 120. The CU control logic 802 can extract DCWs and control data from the TCCB received at the control unit 110 to control a device, for instance, I/O device 112 via connection 126. The CU control logic 802 sends device commands and data to the I/O device 112, and receives status information and other feedback from the I/O device 112. When the CU control logic 802 receives data, such as the first checking block boundary of the 16K bytes of data 706 of FIG. 7, the CU control logic 802 writes this data received into data buffer 804 for temporary storage, until the CRC is received for the checking block boundary is checked, then that data may be sent to the I/O device 112. This continues for each checking block boundary until the I/O operation is completed.

The control unit 110 may further include other queue or memory elements (not depicted) for storing additional message or status information associated with communications between the channel 124 and the I/O device 112.

The channel 124 in the channel subsystem 108 includes elements to support communication with the control unit 110. For example, the channel 124 may include CHN control logic 806 that interfaces with the gather data logic 812. The gather data logic 812 is described herein below in reference to FIG. 10. In an exemplary embodiment, the CHN control logic 806 controls communication between the channel subsystem 108 and the control unit 110. The CHN control logic 806 may directly interface to the CU control logic 802 via the connection 120 to send commands and receive responses, such as transport commands and response IUs. Alternatively, messaging interfaces and/or additional buffers (not depicted) can be placed between the CHN control logic 806 and the CU control logic 802. The CHN subsystem registers 814 can include fixed values that provide configuration and status information, as well as dynamic status information, updated as commands are transported and responses are received. The CHN subsystem registers 814 may be dedicated hardware registers and/or virtual registers established using memory mapping.

In one embodiment, the CHN subsystem registers 814 include the TIDAL 410 and TIDAWs 412-416 of FIG. 4 as memory mapped registers.

Figure 9:
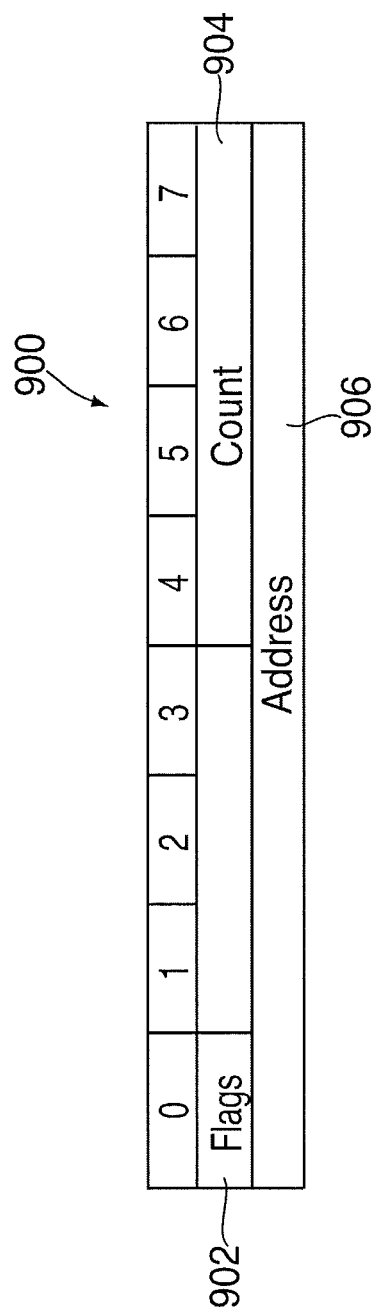
FIG. 9 depicts one embodiment of a transport mode indirect data address word (TIDAW), in accordance with an aspect of the present invention.

One example of a TIDAW 900 is depicted in FIG. 9. The TIDAW 900 provides indirect addressing to data used in a TCW channel program, such as the TIDAWs 412-416 of FIG. 4. The TIDAW 900 includes flags 902, a count 904, and an address 906. Each field (i.e., flags 902, count 904, and address 906) in the TIDAW format 900 is assigned to a particular byte address to support parsing of the fields. Although one arrangement of fields within the TIDAW 900 is depicted in FIG. 9, it will be understood that the order of fields can be rearranged to alternate orderings.

In an exemplary embodiment, the flags 902 include a last TIDAW flag and a transport-transfer in channel (T-TIC) flag, in addition to other flags. The last TIDAW flag indicates that the associated TIDAW is the last TIDAW in a TIDAL, consistent with the definition for a MIDAW. When count 904 goes to zero with the last TIDAW flag set, the data transfer for the associated I/O operation is complete. The T-TIC flag indicates whether the contents of the address 906 include data or the address of the next TIDAW in the TIDAL. In an exemplary embodiment, when the T-TIC flag is set, then the address 906 in the TIDAW is the address of the next TIDAW in the TIDAL. In the manner, the address 906 may be utilized to access a TIDAW at a non-contiguous storage location from the current TIDAW. Thus, the TIDAW list can contain more than 256 entries, thereby exceeding the maximum number of allowable indirect data address words in current implementations. In an exemplary embodiment, when the T-TIC flag is set the address 906 must have the four low order bits set to zero because the 16 byte TIDAW must be on a 16 byte address boundary. When the T-TIC flag is not set, then the address 906 in the TIDAW is the address of a portion of the data that makes up the data being gathered for the I/O operation. The size of the data is indicated in the count field 904. If the last TIDAW flag and the T-TIC flag are not set, then the next TIDAW is located in the next storage location (e.g., it is contiguous to the current TIDAW).

Figure 10:
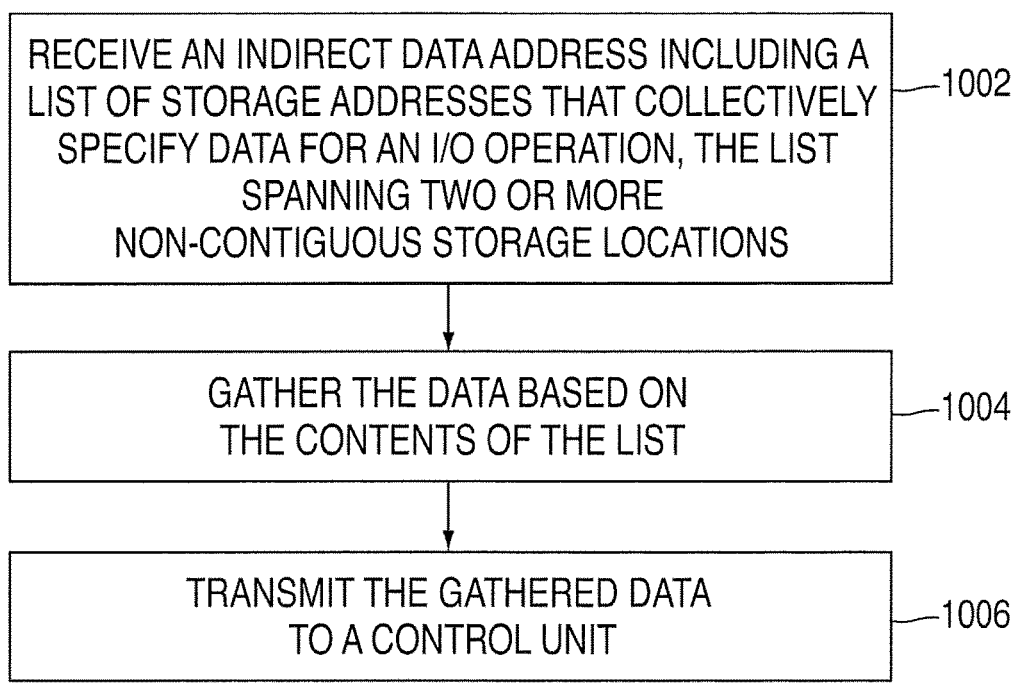
FIG. 10 depicts one embodiment of a process for providing non-contiguous indirect data addressing at an I/O subsystem.

Turning now to FIG. 10, a process 1000 for gathering data for an I/O operation will now be described in accordance with exemplary embodiments, and in reference to the I/O processing system 100 of FIG. 1. At block 1002, the channel subsystem 108 receives a control word for an I/O operation (e.g., a TCW). The control word includes an indirect data address that points to the starting address of a list of storage addresses (e.g., a TIDAL having multiple TIDAWs) that make up the data utilized by the by the I/O operation. In exemplary embodiments, the data is customer data (e.g., data input or output from the I/O operation). In alternate exemplary embodiments, the data is control data (e.g., a TCCB). In an exemplary embodiment, the list of storage addresses spans two or more non-contiguous storage locations.

At block 1004, the data is gathered by instructions located at the channel subsystem 108. The gathering is based on the contents of the list. In an exemplary embodiment, each entry in the list (e.g., each TIDAW) includes both a storage address and a T-TIC flag to indicate whether the storage address is the location of a portion of the data, or whether the storage address points to the location of another portion of the list containing more storage addresses. In this manner, a single TIDAL can be contained in multiple pages removing any restraints on the length of the TIDAL. When the T-TIC flag indicates that the storage address is the location of a portion of the data (e.g., the T-TIC flag is not set), then the data at the storage location is accessed and added to the data. This adding of new data can be performed in any manner known in the art, such as merging with data already gathered, appending to data already gathered, etc.

When the T-TIC flag indicates that the current storage address is the location of another portion of the list, then processing continues by accessing a new TIDAW located at the specified storage location. Data at the storage location specified in the new TIDAW is accessed and added to the data. In an exemplary embodiment, the TIDAW includes a count 904 to specify how much data to read (or write) from each storage address. When a TIDAW with the last TIDAW flag is set the gathering is completed. Otherwise, the next TIDAW is accessed and the data gathering continues.

At block 1006, the data is transmitted to a control unit 110 by the channel subsystem 108.

Technical effects of exemplary embodiments include providing non-contiguous indirect data addressing at a I/O subsystem. By allowing multiple 4 k byte pages to contain the list of storage addresses (TIDAL) allows the number of TIDAWs to be unlimited, therefore more data can be associated with a single I/O operation. Large transfers of data can reduce communication overhead by avoiding additional handshaking and other delays associated with multiple smaller messages.

The following examples depict manners in which exemplary embodiments may be utilized to perform more than moving large blocks of data.

Exemplary embodiments may be utilized to aid in the prefixing of a channel program by an operating system. For example, when a channel program is passed to an operating system, the operating system may modify the channel program to add, replace, or modify command CCWs or DCWs. In an exemplary embodiment, this implies that a TCCB TIDAL will be created where the first TIDAW points to an area of storage containing the first part of the modified TCCB. The second TIDAW points to the remainder of the unmodified TCCB.

Exemplary embodiments may also be used to aid in the prefixing of channel programs by a hypervisor. If the hypervisor needs to modify the channel program, it would need to create a TIDAL with one more entry than the one passed by the guest. If the TIDAL passed by the guest is already the maximum size (256 TIDAWs), then the hypervisor can make its own modifications by creating a TCCB TIDAL that has two TIDAWs, one of which is the T-TICs to the first TIDAW of the TIDAL passed by the guest.

TIDAL T-TICs can also ease storage requirements for operating systems. If the channel program containing a TCCB TIDAL needs to be modified, it takes less storage to create a TIDAW and T-TIC than to allocated storage for the caller's TCCB TIDAL plus one more TIDAW.

Figure 11:
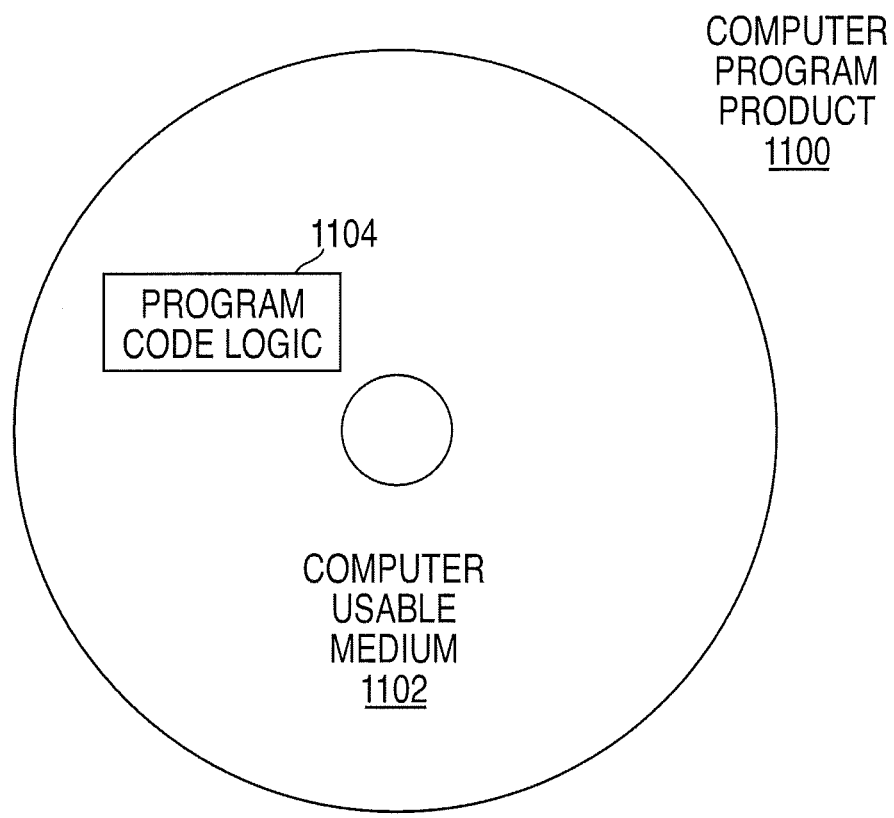
FIG. 11 depicts one embodiment of an article of manufacture incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 1100 as depicted in FIG. 11 on a computer usable medium 1102 with computer program code logic 1104 containing instructions embodied in tangible media as an article of manufacture. Exemplary articles of manufacture for computer usable medium 1102 may include floppy diskettes, CD-ROMs, hard drives, universal serial bus (USB) flash drives, or any other computer-readable storage medium, wherein, when the computer program code logic 1104 is loaded into and executed by a computer, the computer becomes an apparatus for practicing the invention. Embodiments include computer program code logic 1104, for example, whether stored in a storage medium, loaded into and/or executed by a computer, or transmitted over some transmission medium, such as over electrical wiring or cabling, through fiber optics, or via electromagnetic radiation, wherein, when the computer program code logic 1104 is loaded into and executed by a computer, the computer becomes an apparatus for practicing the invention. When implemented on a general-purpose microprocessor, the computer program code logic 1104 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product for processing input/output (I/O) data at an I/O subsystem of an I/O processing system, the computer program product comprising:
   a computer readable storage medium having program instructions embodied therewith, wherein the computer readable storage medium is not a transitory signal per se, the program instructions executable by a processing circuit to perform a method comprising:
      receiving a transport control word (TCW) at the I/O subsystem for an I/O operation, the TCW including an indirect data address for data associated with the I/O operation, the indirect data address including a starting location of a transport mode indirect data address list (TIDAL) of storage addresses that collectively specify the data, the TIDAL including a plurality of entries configured as transport mode indirect data address words (TIDAWs);
      gathering the data, wherein gathering comprises accessing an entry of the TIDAL, the entry located at an entry storage location and including an address, wherein accessing includes 1) and 2):
      1) based on the entry of the TIDAL indicating that the address is a data address, gathering data from a data storage location corresponding to the data address, and accessing a next entry of the TIDAL; and
      2) based on the entry of the TIDAL indicating that the address is an address of a next entry of the TIDAL, obtaining the next entry of the TIDAL from another storage location that is located non-contiguously to the entry storage location; and
      transmitting gathered data to a control unit in the I/O processing system, the control unit configured to control an I/O device for executing the I/O operation.

2. The computer program product of claim 1, wherein the data address refers to a portion of the data and the address of the next entry refers to a storage location where one or more storage addresses of the list are located.

3. The computer program product of claim 1, wherein the entry includes a flag, the flag indicating that the address is the data address when the flag is not set and indicating that the address is the address of the next entry when the flag is set.

4. The computer program product of claim 3, wherein for each entry in the TIDAL, the gathering includes:
   based on the entry of the TIDAL comprising the not-set first flag, adding contents from the data address to the data; and
   based on the entry of the TIDAL comprising the set first flag, accessing the another storage address and a second flag located at the another storage address, and adding contents from the another storage address to the data based on the second flag being a not-set second flag.

5. The computer program product of claim 1, wherein the TIDAL further includes a count field associated with each storage address in the TIDAL, the count field indicating a number of bytes to read from the storage address and the gathering is based on the count fields and to the storage addresses.

6. The computer program product of claim 1, wherein the TCW includes at least one device control word (DCW) that specifies a command to be executed by a control unit.

7. The computer program product of claim 6, wherein the method further comprises forwarding a transport command control block (TCCB) from the I/O subsystem to the control unit, the TCCB including at least one DCW and configured to hold a plurality of DCWs, the TCCB being obtained from a location identified by the TCW.

8. The computer program product of claim 1, wherein the gathering includes accessing successive entries of the TIDAL until a last entry is accessed.

9. The computer program product of claim 1, wherein the method further comprises, based on an entry of the TIDAL comprising a set last entry flag, determining that the entry is a last entry to be accessed.

10. The computer program product of claim 1, wherein the next entry of the TIDAL is contiguous to the entry when the entry indicates that the address is the data address.

11. An apparatus for processing input/output (I/O) data, the apparatus comprising:
   an I/O subsystem configured for communication with a control unit in an I/O processing system, the I/O subsystem configured to perform a method comprising:
      receiving a transport control word (TCW) at the I/O subsystem for an I/O operation, the TCW including an indirect data address for data associated with the I/O operation, the indirect data address including a starting location of a transport mode indirect data address list (TIDAL) of storage addresses that collectively specify the data, the TIDAL including a plurality of entries configured as transport mode indirect data address words (TIDAWs);
      gathering the data, wherein gathering comprises accessing an entry of the TIDAL, the entry located at an entry storage location and including an address, wherein accessing includes 1) and 2):
      1) based on the entry of the TIDAL indicating that the address is a data address, gathering data from a data storage location corresponding to the data address, and accessing a next entry of the TIDAL; and
      2) based on the entry of the TIDAL indicating that the address is an address of a next entry of the TIDAL, obtaining the next entry of the TIDAL from another storage location that is located non-contiguously to the entry storage location; and transmitting gathered data to the control unit, the control unit configured to control an I/O device for executing the I/O operation.

12. The apparatus of claim 11, wherein the data address refers to a portion of the data and the address of the next entry refers to a storage location where one or more storage addresses of the list are located.

13. The apparatus of claim 11, wherein the entry includes a flag, the flag indicating that the address is the data address when the flag is not set and indicating that the address is the address of the next entry when the flag is set.

14. The apparatus of claim 13, wherein for each entry in the TIDAL, the gathering includes:
based on the entry of the TIDAL comprising the not-set first flag, adding contents from the data address to the data; and
based on the entry of the TIDAL comprising the set first flag, accessing the another storage address and a second flag located at the another storage address, and adding contents from the another storage address to the data based on the second flag being a not-set second flag.

15. The apparatus of claim 11, wherein the TCW includes at least one device control word (DCW) that specifies a command to be executed by a control unit.

16. The apparatus of claim 15, wherein the method further comprises forwarding a transport command control block (TCCB) from the I/O subsystem to the control unit, the TCCB including at least one DCW and configured to hold a plurality of DCWs, the TCCB being obtained from a location identified by the TCW.

17. The apparatus of claim 11, wherein the gathering includes accessing successive entries of the TIDAL until a last entry is accessed.

18. The apparatus of claim 11, wherein the next entry of the TIDAL is contiguous to the entry when the entry indicates that the address is the data address.

19. A method of processing input/output (I/O) data at an I/O subsystem configured for communication with a control unit in an I/O processing system, the method comprising:
receiving a transport control word (TCW) at an I/O subsystem for an I/O operation, the TCW including an indirect data address for data associated with the I/O operation, the indirect data address including a starting location of a transport mode indirect data address list (TIDAL) of storage addresses that collectively specify the data, the list including a plurality of entries configured as transport mode indirect data address words (TIDAWs);
gathering the data, wherein gathering comprises accessing an entry of the TIDAL, the entry located at an entry storage location and including an address, wherein accessing includes 1) and 2):
1) based on the entry of the TIDAL indicating that the address is a data address, gathering data from a data storage location corresponding to the data address, and accessing a next entry of the TIDAL; and
2) based on the entry of the TIDAL indicating that the address is an address of a next entry of the TIDAL, obtaining the next entry of the TIDAL from another storage location that is located non-contiguously to the entry storage location; and
transmitting gathered data to the control unit, the control unit configured to control an I/O device for executing the I/O operation.

20. The method of claim 19, wherein the entry includes a flag, the flag indicating that the address is the data address when the flag is not set and indicating that the address is the address of the next entry when the flag is set.

21. The method of claim 20, wherein for each entry in the TIDAL, the gathering includes:
based on the entry of the TIDAL comprising the not-set first flag, adding contents from the data address to the data; and
based on the entry of the TIDAL comprising the set first flag, accessing the another storage address and a second flag located at the another storage address, and adding contents from the another storage address to the data based on the second flag being a not-set second flag.

22. The method of claim 19, wherein the TCW includes at least one device control word (DCW) that specifies a command to be executed by a control unit, and the method further comprises forwarding a transport command control block (TCCB) from the I/O subsystem to the control unit, the TCCB including at least one DCW and configured to hold a plurality of DCWs, the TCCB being obtained from a location identified by the TCW.

23. The method of claim 19, wherein the gathering includes accessing successive entries of the TIDAL until a last entry is accessed.

24. The method of claim 19, wherein the next entry of the TIDAL is contiguous to the entry when the entry indicates that the address is the data address.

* * * * *